United States Patent
Urban

(10) Patent No.: US 9,370,912 B2
(45) Date of Patent: Jun. 21, 2016

(54) PULP MOLDED BIODEGRADABLE REMOVABLY CONNECTABLE LID

(71) Applicant: NATURES SOLUTIONS LLC, Brisbane, CA (US)

(72) Inventor: Eric Urban, Crete, IL (US)

(73) Assignee: NATURES SOLUTIONS LLC, Brisbane, CA (US)

( * ) Notice: Subject to any disclaimer, the term of this patent is extended or adjusted under 35 U.S.C. 154(b) by 288 days.

(21) Appl. No.: 14/186,441

(22) Filed: Feb. 21, 2014

(65) Prior Publication Data

US 2014/0167302 A1 Jun. 19, 2014

Related U.S. Application Data

(62) Division of application No. 12/884,306, filed on Sep. 17, 2010, now abandoned.

(51) Int. Cl.
*B29D 99/00* (2010.01)
*B65D 43/02* (2006.01)

(52) U.S. Cl.
CPC ........ *B29D 99/0096* (2013.01); *B65D 43/0212* (2013.01); *B65D 2543/00046* (2013.01); *Y02W 90/13* (2015.05)

(58) Field of Classification Search
USPC .......................................................... 264/87
See application file for complete search history.

(56) References Cited

U.S. PATENT DOCUMENTS

| | | |
|---|---|---|
| 4,337,116 A | 6/1982 | Foster et al. |
| 5,133,834 A | 7/1992 | Capps |
| 5,279,658 A | 1/1994 | Aung |
| 5,385,255 A | 1/1995 | Varano et al. |
| 5,588,552 A | 12/1996 | Johnson |
| 5,688,448 A | 11/1997 | Shutov et al. |
| 5,705,237 A | 1/1998 | Andersen et al. |
| 6,790,394 B2 | 9/2004 | Kim et al. |
| 6,846,529 B2 | 1/2005 | Mohan et al. |
| 6,878,199 B2 | 4/2005 | Bowden et al. |
| 7,083,673 B2 | 8/2006 | Bowden et al. |
| 7,673,747 B2 | 3/2010 | Yoda |
| 2003/0178736 A1 | 9/2003 | Hwang |
| 2006/0159832 A1 | 7/2006 | Lin |
| 2006/0278641 A1 | 12/2006 | Ziegler |
| 2008/0047966 A1 | 2/2008 | Carson |
| 2008/0179335 A1 | 7/2008 | Lee et al. |
| 2009/0057381 A1 | 3/2009 | Gokhale |
| 2009/0283526 A1 | 11/2009 | Pierce et al. |
| 2010/0062248 A1 | 3/2010 | Kimura et al. |
| 2010/0112247 A1 | 5/2010 | Rasanen et al. |

*Primary Examiner* — Jacob Thomas Minskey

(74) *Attorney, Agent, or Firm* — Marshall, Gerstein & Borun LLP

(57) ABSTRACT

By creating a slurry of biodegradable material, forming it in a mold under a vacuum, a channel may be created in the lid which can be release-ably connected to a traditional rolled lip coffee cup, among other common liquid holding vessels but be made out of biodegradable material. The resulting lid may be elastic enough such that the lid will give to allow a complementary cup to fit into the channel to create a seal between the cup and the lids. It also will be firm enough to withstand the weight and pressure of the liquid inside the container and from pressure from consumers while using the container. The lid also may be sufficiently heat resistant to withstand desired temperatures and liquid exposure for a time long enough for a consumer to enjoy the contents of the container but also be biodegradable.

7 Claims, 4 Drawing Sheets

PULP MOLDED BIODEGRADABLE REMOVABLY CONNECTABLE LID

CROSS-REFERENCE TO RELATED APPLICATION

The present application is a Divisional of U.S. application Ser. No. 12/884,306 filed Sep. 17, 2010. The entire text of the priority application is hereby incorporated by reference.

BACKGROUND

This Background is intended to provide the basic context of this patent application and it is not intended to describe a specific problem to be solved.

Packaging used for containment of liquids can generate large amounts of waste. In some cases, packaging used for containing liquids or lids for capping liquid containers/vessels may be recycled. More recently, it has become common to use bottles and lids made from plastics, such as PET or HDPE, for liquid such as water, juice, carbonated drinks, or milk. In this case, it is common for the bottles or lids to be formed from virgin, i.e. non-recycled, material to ensure that the liquid contained within the bottle is not contaminated as could be the case if the containers were formed from recycled material. While the material itself could be recycled if separated from other waste, as with glass bottles this frequently does not occur due to the need for the waste producer, such as a householder, to separate the containers from other waste material. Again, if the container or lids is disposed of in a landfill site or the like, the bottle or lids is not biodegradable.

It has also been proposed to package and cap liquid in laminated cardboard containers, for example in containers marketed by Tetra Pak. In this case, the cardboard from which the body of the container is formed may be virgin or recycled material. The cardboard is laminated with a waterproof coating. This ensures that the container is able to hold liquid and also acts as a barrier between the liquid and the cardboard, which can prevent contamination of the liquid from the cardboard. This is especially needed where the cardboard is formed from recycled material A problem with such packages is that they are difficult to recycle, and the waterproof coating prevents them fully decomposing.

Manufacturing a biodegradable release-ably connectable lid has long been a challenge. Forming a channel using biodegradable material which does not unacceptably degrade, deform or discolor when in contact with hot liquid such as coffee has been thought to be impossible. By creating a slurry, forming it in a mold under a vacuum, a channel may be created in the lid which can be release-ably connected to a traditional rolled lip coffee cup, among other common liquid holding vessels but be made out of biodegradable material.

SUMMARY

By creating a slurry, forming it in a mold under a vacuum, a channel may be created in the lid which can be release-ably connected to a traditional rolled lip coffee cup, among other common liquid holding vessels but be made out of biodegradable material. The resulting lid may have a combination of desirable qualities. As one example, the lid may be somewhat springy. It may be elastic enough such that the lid will give to allow a complementary cup to fit into the channel to create a seal between the cup and the lids. It also will be firm enough to withstand the weight and pressure of the liquid inside the container and from pressure from consumers while using the container. The lid also may be sufficiently heat resistant to withstand desired temperatures and liquid exposure for a time long enough for a consumer to enjoy the contents of the container but also be biodegradable.

SPECIFICATION

Herein is provided a material and method for creating a biodegradable lid. The articles and methods described herein may be understood more readily by reference to the following detailed description and the examples provided. It is to be understood that this invention is not limited to the specific components, articles, processes and/or conditions described, as these may, of course, vary. It is also to be understood that the terminology used herein is for the purpose of describing particular embodiments only and is not intended to be limiting. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
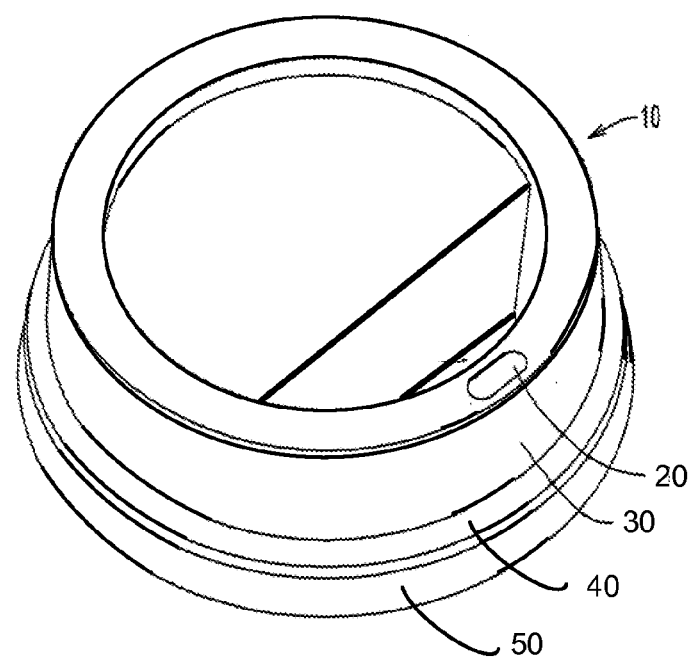
FIG. 1 is an illustration of a sample lid.

FIG. 1 may illustrate a sample coffee lid 10 that is biodegradable. Lids 10 are well known. In general, lids 10 cover or attach to a cup or container. Some lids 10 have opening 20 from which a user can drink. Other lids 10 are solid with no openings 20. Lids 10 are usually remove-ably connected to a container.

Certain lids 10 are subject to additional challenges. As an example and not limitation, lids 10 for coffee must be able to withstand significant heat without immediately degrading or affecting the taste of the coffee. Additionally, consumers are accustomed to coffee lids 10 not changing color once the lid 10 has come in contact with coffee. Further, the lid 10 has to not stick to the mouth of the consumer, either when warm or when cold. At the same time, the lids 10 have to be able to be used for the delivery and/or storage of beverages for human consumption or for the delivery of other materials not for human consumption. Examples of liquids that can be contained include beverages, syrups, concentrates, soaps, inks, gels, solids, chemicals and powders. The vessels or containers, for example and not limitation, may be coffee cups, which may be made of one type of material, facilitating full recycling of the materials. In other embodiments, the container can be a combination of several types of materials. There is no requirement that the lid 10 and container be of the same material.

Manufacturing a biodegradable release-ably connectable lid 10 has long been a challenge. Forming a channel 40 in a lid 10 using biodegradable material which does not unacceptably degrade, deform or discolor when in contact with hot liquid such as coffee has been thought to be impossible. By creating a slurry, forming it in a mold under a vacuum, a channel 40 may be created in the lid 10 which can be release-ably connected to a traditional rolled lip coffee cup, among other common liquid holding vessels/containers but be made out of biodegradable material.

Figure 2:
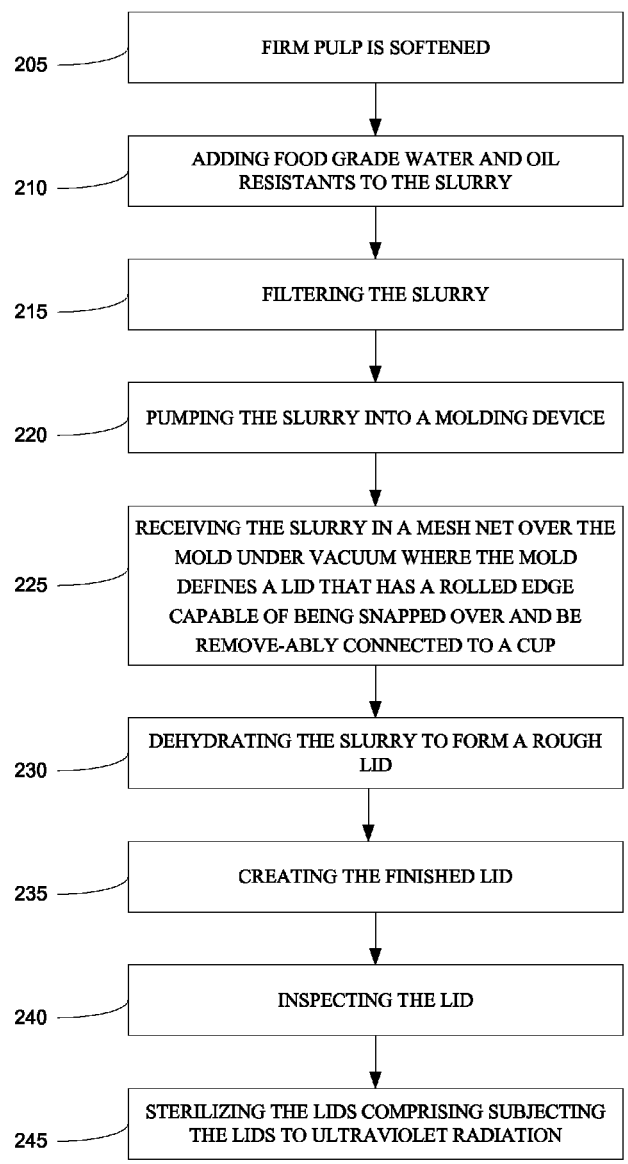
FIG. 2 is an illustration of a method of manufacturing the lid.

FIG. 2 may illustrate a process of creating a lid 10 that can be remove-ably connected to a container with a rolled lip but still be degradable. The material used for forming the lids may be food-grade. The material may be biodegradable materials, such as molded fiber or pulp or paper. For example, the lids 10 may be 100% post consumer fiber or pulp feedstock. In another example, the lids 10 may be 100% recycled corrugated fiberboard and newspaper. The materials described herein can include virgin pulp fiber and may include type-2 molded fiber, type-2A thermoformed fiber, type-3 thermoformed fiber, type-4 thermoformed fiber, molded fiber, X-RAY formed fiber, infrared formed fiber, microwave formed fiber, vacuum formed fiber, structural fiber, sheet stock, recycled plastic or any other structural material. Any of the materials that may be used to form the lid 10 may be used in any of the embodiments described herein.

The lids 10 may include an accelerator that helps promote the degradation of the lids 10 after use. Alternatively or additionally, additives may be included which help breakdown the intended content of the lids 10—for example where the container is to carry oil, an additive may be included in the lid 10 which helps breakdown oil over time, increasing the recyclable properties of the container.

At block 205, a firm pulp is softened. The firm pulp may be, for example and not limitation, sugarcane, rice, bamboo, wood fiber, recycled paper or wheat fibers. Of course, other sources of firm pulp may be possible and are contemplated.

The softening may entail soaking the firm pulp in a liquid. The liquid may be, for example and not limitation, water. In some embodiments, the water is simple potable tap water. In other embodiments, the water is further filtered. Additional additives may also be added to the liquid such as edible coloring agents. Of course, other liquids may be appropriate and are contemplated. Other softening recipes are possible.

At block 210, food grade water and oil resistants may be added to the slurry. By way of example and not limitation, the food grade water and oil resistants may include DuPont Zonyl 9464. Of course, other water resistants and oil resistants are possible.

The pulp may be compressed into a pulp pool until the pulp pool transforms into a slurry. In one embodiment, pressure is applied to the pulp pool using, for example and not limitation, hydraulic pressure. In another embodiment, the pressure is applied until a desired liquid content is present in the slurry or until the slurry reaches a desired temperature. In other embodiments, At block 215, the slurry may be filtered. The filtering may be accomplished using any appropriate filtering method or device. As an example and not limitation, a mesh screen may be used. Of course, other filtering methods and apparatus are possible and are contemplated.

At block 220, the slurry may be pumped into a molding device. As is known, a mold may be used to form a raw material, such as metal, or in this case, a slurry into a desired shape. The shape may be determined by a pattern. As an example and not limitation, the mold may be made by making a pattern using copper and steel with a thickness of 30 mm to 50 mm or some other material that cannot be melted away or by a material that is hard and does not deflect that is used to create a void that is filled with the slurry.

Figure 4:
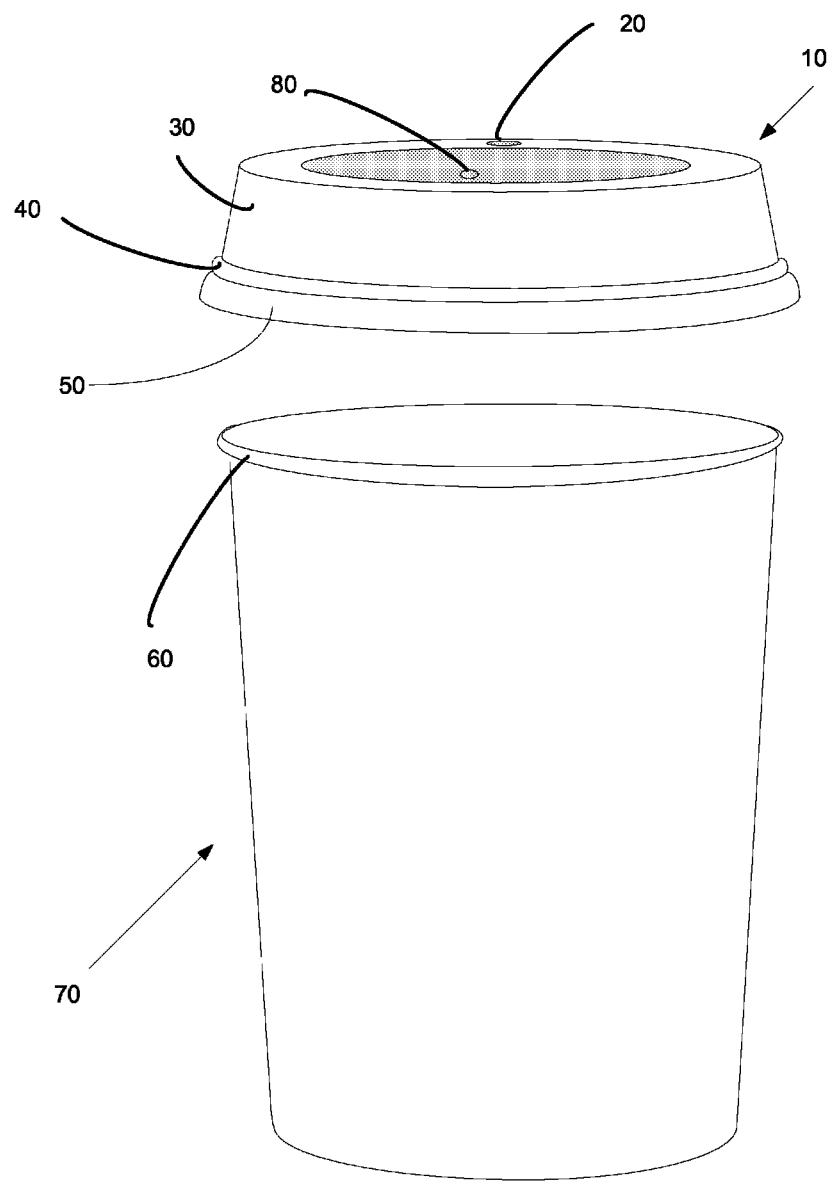
FIG. 4 is an illustration of the lid.

At block 225, the slurry may be received in a mesh net over the mold under vacuum. The mesh net is used to further filter the slurry and remove any large chunks from the slurry. The vacuum is used to pull the raw material, specifically, the slurry, into virtually all the voids of the mold. In this case, the mold may define a lid 10 that has a channel 40 capable of being snapped over and be remove-ably connected to a cup or other container. FIG. 4 may be an illustration of one possible lid 10 and complementary container 70.

The channel 40 may be of a size and shape to snap over the rolled edge 60 of a cup 70 or other container. In one embodiment, the channel 40 is substantially round or annular. In another embodiment, the channel 40 is more oval in shape. In virtually all embodiments, the shape and size of the channel 40 is designed in a way to be remove-ably connectable to a container 70. The channel 40 may be complementary to the portion of the lid 10 that will fit into the channel 40. In the coffee cup example, the channel 40 may be substantial round to match the size and shape of the rolled top 60 of a coffee cup or other container 70.

The sides 30 of the lid 10 may be virtually any shape. The sides 30 may be designed to ease the purpose of the lid 10. For example, if the lid 10 is for coffee, the sides 30 may be substantially vertical to ease drink-ability. In another embodiment, the sides 30 may be short in order to minimize the height of the lid 10 to ensure it stays on and is not bumped off during transport. The sides 30 may be linear or may be curved based on purpose and aesthetics. The sides 30 may be substantially perpendicular to the top of the lid 10. Of course, other designs for the sides 30 of the lid 10 are possible and are contemplated.

The top of the lid 10 may have a hole or opening 20 to allow the liquid in the container 70 to flow. The hole 20 may be of any useful shape, such as an oval or circle. In some embodiments, the hole 20 may be on the top of the lid 10 and in other embodiments, the hole may be on a side 30 of the lid 10. In some embodiments, the hole 20 in the lid 10 may be re-closeable. As an example and not limitation, the hole 10 may be a spout that it part of or attached to the lid 10 and the spout may be sealable. In another embodiment, the lid 10 may have a section that may be peeled back to allow drinking but may be peeled forward to virtually reseal the lid 10. In yet another embodiment, the hole 20 may be in a depression of the lid 10 to improve drink-ability.

The lids 10 may also have a relief hole 80 as part of the lid 10 to allow liquid to flow in a continuous fashion from the container. The purpose of the relief hole 80 is to allow air to fill the space when liquid leaves the container to allow smooth, uninterrupted pouring from the container 70.

The outside edge of the lid may be flared 50 to allow the lid 10 to more easily be placed onto the container 70. In some embodiments, the flare 50 may be curved and in other embodiments, the flare 50 may be slight. The bottom of the lid 10 may be treated such that the bottom is not sharp enough to cause a cut of human during its foreseeable and intended uses.

At block 230, the slurry may be dehydrating to form a rough lid 10. Dehydrating may occur in any appropriate manner. In one embodiment, heat is applied to the lid 10 to remove moisture. In another embodiment, air is circulated to assist the removal of moisture. In some embodiments, both circulation of air and heat are used to assist removal of the moisture in the slurry. Of course, the dehydration may be accomplished by placing the lids 10 in a dry area and allowing the lids to naturally dehydrate. In one example, dehydration is accomplished by subjecting the lids to a temperature of approximately 228 degrees Fahrenheit for a sufficient period of time.

At block 235, the finished lid 10 may be created. As the slurry is poured in the mold, excess slurry may be attached to the lids 10. The excess material may be cut from the rough lid 10 so that the lid 10 may have no rough edges and a form that will release-ably connect to a container 70.

At block 240, the lid 10 may be inspected to determine whether the lid is acceptable. For example and not limitation, the appearance of the finished lid may be reviewed to determine if it is acceptable. Some possible checks include determining if the appearance has color, luster, and lack of creases within appropriate tolerances.

Figure 3:
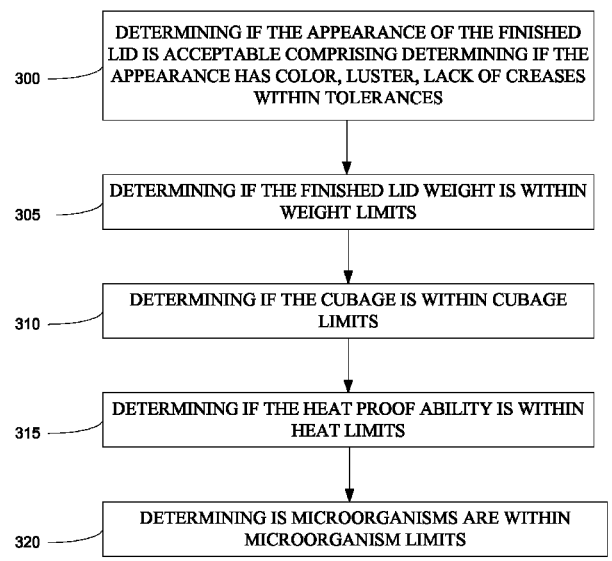
FIG. 3 is an illustration of inspecting the lid.

FIG. 3 may illustrate some possible steps in the lid inspection process. At block 300, the inspection process may determine if the finished lid 10 weight is within weight limits. If the weight is acceptable, the lid 10 may be tested further. If the weight of the lid 10 is outside the weight limits, it may be rejected. If a lid 10 is rejected, it may be used as pulp to begin the process again.

At block 305, it may be determined if the cubage of the lid 10 is within cubage limits. Cubage is term that connotes the content or volume of the lid 10. In some embodiments, a statistically significant number of lids 10 from a batch are tested as testing every lid may be onerous. If the cubage is outside the cubage limits, the lid 10 may be rejected and may be used as pulp to begin the process again. If the cubage is within acceptable limits, the lid 10 may be tested further.

At block 310, it may be determining if the heat proof ability of the lids 10 is within heat limits. In this test, a random sample of lids 10 from a particular batch of lids 10 may be tested to determine if the lids 10 are sufficiently heat proof. In one embodiment, the lids 10 are subjected to heat near the temperature of hot coffee, such as approximately 228 degrees Fahrenheit. The heat may be applied indirectly, such as placing the lids 10 in an oven or the lids 10 may be placed in a liquid that is near the temperature of hot liquid. The response of the lids 10 to the heat may be observed and if the response is acceptable, the lids may be subjected to further tests. If the lids response to heat is not acceptable, the lids 10 (or the entire batch of lids 10) may be rejected and the lids 10 may be used as pulp for future lids 10.

At block 320, it may be determining if microorganisms in the lid 10 are within microorganism limits. As the process involves sources which may have microorganisms, the microorganisms may survive the manufacturing process. In one embodiment, the lids 10 may be examined under a microscope to determine if the microorganisms are at an acceptable level. In some embodiments, the determination is automated. In some embodiments, a statistically significant number of lids 10 from a batch are tested as testing every lid may be onerous. If the determination is that there are too many microorganisms, the lids 10 may be rejected. If possible, the lids 10 may be treated to eliminate the microorganisms. If the determination is that the microorganism level is acceptable, the lids may be deemed acceptable and may be prepared for shipping.

Referring again to FIG. 2, at block 245, the lids 10 may be sterilized. In one embodiment, the lids 10 may be subject to ultraviolet radiation for sterilization purposes. Of course, other methods of sterilization are possible and are contemplated. In addition, the lids 10 may be sealed into sealable bags to maintain the sterilized nature of the lids.

The result will be a lid 10 that will biodegrade. Biodegradable means the lid 10 will be able to decompose naturally. In other words, the lid 10 may be made of substances that will decay relatively quickly as a result of the action of bacteria and break down into elements such as carbon that are recycled naturally. The resulting lids 10 may be capable of being broken down and naturally absorbed into the ecosystem. Biodegradable materials may degrade into simple stable compounds that are not harmful to the environment. Unlike traditional lids that may never biodegrade, the resulting lids 10 will naturally break down over time.

Aside from the method of manufacturing the lid 10, the lid 10 itself will now be described. FIG. 1 may be an illustration of the lid 10. The lid 10 may have a grooved channel 40 around the perimeter of the lid 10 that can remove-ably receive a rolled lip 60 from a container 70 wherein the container 70 is made from a variety of materials. The lid 10 may be elastic enough to bend to accept the complementary rolled lip of the container 60 and snap around the complementary rolled lip 60 of the container 70 to make a useful seal such that liquids will not leak out in normal usage.

The lids 10 may consist of a pulp that has been manufactured by softening a firm pulp by soaking the firm pulp in a liquid until the pulp forms into a pulp pool and then into a slurry. Food grade water and oil resistants may be added to the slurry, the slurry may be filtered and the slurry may be pumped into a molding device. The slurry may be received in a mesh net over the mold under vacuum wherein the mold defines a lid 10 that has a grooved channel 40 around the perimeter of the lid 10 that can remove-ably receive a rolled lip 60 from a container 70 that is capable of being snapped over and be remove-ably connected to a cup 70 to form a releasable seal. The slurry may be dehydrated to form a rough lid 10 and the rough lid 10 may be finished by cutting the excess material from the rough lid 10. The lid 10 may be inspected to see if it meets the desired tolerances such as whether the appearance of the finished lid 10 is acceptable (color, luster, lack of creases within tolerances), if the finished lid 10 weight is within weight limits, if the cubage is within cubage limits, if the heat proof ability is within heat limits and if microorganisms are within microorganism limits. The lids 10 may be sterilized by subjecting the lids 10 to ultraviolet radiation.

The resulting lid 10 may have a combination of desirable qualities. As one example, the lid 10 may be somewhat elastic. It may be elastic enough such that the lid 10 will give to allow a complementary cup top 60 to fit into the channel 40 to create a seal between the cup top 60 and the lids 10. It also may be firm enough to withstand the weight and pressure of the liquid inside the container and from pressure from consumers while using the container. The lid 10 also may be sufficiently heat resistant to withstand desired temperatures and liquid exposure for a time long enough for a consumer to enjoy the contents of the container but also be biodegradable.

It should be understood from the foregoing that, while particular implementations have been illustrated and described, various modifications can be made thereto and are contemplated herein. It is also not intended that the claims be limited by the specific examples provided within the specification. Parts of one embodiment may be easily removed and added to another embodiment. While the claims have been described with reference to the aforementioned specification, the descriptions and illustrations of the preferable embodiments herein are not meant to be construed in a limiting sense. Furthermore, it shall be understood that all aspects of the claims are not limited to the specific depictions, configurations or relative proportions set forth herein which depend upon a variety of conditions and variables.

Various modifications in form and detail of the embodiments of the claim will be apparent to a person skilled in the art. It is therefore contemplated that the claim shall also cover any such modifications, variations and equivalents. While preferable embodiments of the claims have been shown and described herein, it will be obvious to those skilled in the art that such embodiments are provided by way of example only. Numerous variations, changes, and substitutions will now occur to those skilled in the art without departing from the claims. It should be understood that various alternatives to the embodiments of the invention described herein may be employed in practicing the claims.

The invention claimed is:

1. A method of manufacturing a biodegradable lid comprising:
    softening a firm pulp comprising soaking the firm pulp in a liquid;
    allowing the pulp to soften into a pulp pool until the pulp pool transforms into a slurry;
    adding food grade water and oil resistants to the slurry;
    filtering the slurry;
    pumping the slurry into a molding device;
    receiving the slurry in a mesh net over the mold under vacuum wherein the mold defines a lid that has a rolled edge capable of being snapped over and be remove-ably connected to a cup;
    dehydrating the slurry to form a rough lid;
    creating the finished lid comprising cutting the excess material from the rough lid;
    inspecting the lid comprising determining if the appearance of the finished lid is acceptable; and
    sterilizing the lids comprising subjecting the lids to ultraviolet radiation.

2. The method of claim 1, wherein determining if the appearance of the finished lid is acceptable further comprises:
    determining if the appearance has color, luster, lack of creases within tolerances;
    determining if the finished lid weight is within weight limits;
    determining if the cubage is within cubage limits;
    determining if the heat proof ability is within heat limits; and
    determining is microorganisms are within microorganism limits.

3. The method of claim 1, further comprising sealing the lids into sealable bags.

4. The method of claim 1, further comprising inspecting the lids against final tolerances.

5. The method of claim 1, wherein the firm pulp is selected from a group comprising:
    sugarcane, rice, bamboo, wood fiber, recycled paper and wheat.

6. The method of claim 1, wherein the lid further comprises a top that comprises a hole to allow liquid to flow and a rounded sidewall that is substantially perpendicular to the top, is connected to the top and is flared to allow the sidewall to be placed over a receiving container.

7. The method of claim 6, wherein the grooved channel is part of the sidewall.

* * * * *